(12) United States Patent
Matsuda et al.

(10) Patent No.: US 11,510,399 B2
(45) Date of Patent: Nov. 29, 2022

(54) GRIP FOR FISHING ROD AND FISHING ROD USING THE GRIP

(71) Applicant: Shimano Inc., Sakai (JP)

(72) Inventors: Yuki Matsuda, Sakai (JP); Yuki Tokuyama, Sakai (JP); Nobuhiro Suganuma, Sakai (JP)

(73) Assignee: SHIMANO INC., Osaka (JP)

( * ) Notice: Subject to any disclaimer, the term of this patent is extended or adjusted under 35 U.S.C. 154(b) by 86 days.

(21) Appl. No.: 17/029,368

(22) Filed: Sep. 23, 2020

(65) Prior Publication Data
US 2021/0112796 A1 Apr. 22, 2021

(30) Foreign Application Priority Data
Oct. 18, 2019 (JP) .............................. JP2019-191113

(51) Int. Cl.
*A01K 87/08* (2006.01)

(52) U.S. Cl.
CPC .................................... *A01K 87/08* (2013.01)

(58) Field of Classification Search
CPC ........ A01K 87/08; A01K 87/00; A63B 53/14; A63B 60/06; A63B 60/18; A63B 60/14; B62B 5/06; B62B 5/067; B62K 11/14; B62K 21/12; B62K 21/125; B62K 21/14; B62K 21/145; B62K 21/16; B62K 21/26
USPC ....... 473/282, 298, 300, 301, 302, 303, 516, 473/524, 537, 538, 549, 551; 16/110.1, 16/111.1, 421, 430
See application file for complete search history.

(56) References Cited

U.S. PATENT DOCUMENTS

| 593,162 | A | * | 11/1897 | Miller | ..................... | B62K 21/26 74/551.9 |
| 3,344,684 | A | * | 10/1967 | Steere, Jr. | .............. | B62K 21/26 74/551.9 |
| 4,108,436 | A | * | 8/1978 | Masi | ...................... | A63B 60/18 74/551.9 |
| 5,018,733 | A | * | 5/1991 | Buand | .................... | A63B 60/54 473/550 |
| 5,397,123 | A | * | 3/1995 | Huang | ........................ | C09J 7/24 473/550 |
| 6,648,535 | B2 | * | 11/2003 | Ferrara, Jr. | ............ | B25G 1/102 401/6 |
| 8,506,418 | B2 | * | 8/2013 | Tremulis | ................ | A63B 60/10 473/300 |

(Continued)

FOREIGN PATENT DOCUMENTS

JP 2004-057098 A 2/2004

*Primary Examiner* — Darren W Ark
*Assistant Examiner* — Katelyn T Truong
(74) *Attorney, Agent, or Firm* — United IPCounselors, LLC

(57) ABSTRACT

A grip for fishing rod and a fishing rod including the grip that is disposed at a rear end portion of a fishing rod body of an elongated rod shape are disclosed. The grip includes a core body having a cylindrical shape of a predetermined thickness, and a tail end body. The core body is configured to be fitted onto an outside of a core having a cylindrical shape at the rear end portion of the fishing rod body 11. The tail end body is configured to cover a rear end opening of the core body. The core body and the tail end body are integral. The core body has a peripheral wall that has a void portion along a grip axis direction.

9 Claims, 12 Drawing Sheets

(56) References Cited

U.S. PATENT DOCUMENTS

| | | | |
|---|---|---|---|
| 2003/0109326 A1* | 6/2003 | Roelke | A63B 60/14 473/300 |
| 2006/0094525 A1* | 5/2006 | Hung | A63B 53/14 473/300 |
| 2008/0113826 A1* | 5/2008 | Lin | A63B 60/00 473/302 |

* cited by examiner

GRIP FOR FISHING ROD AND FISHING ROD USING THE GRIP

CROSS-REFERENCE TO RELATED APPLICATIONS

This application claims priority to Japanese Patent Application No. 2019-191113, filed Oct. 18, 2019. The contents of that application are incorporated by reference herein in their entirety.

TECHNICAL FIELD

The present invention relates to a grip for fishing rod and a fishing rod.

BACKGROUND ART

A known fishing rod in the related art includes a main body, a tail end body, and a braided line to form a grip part of, for example, a rod for catching carp (see, for example, Japanese Unexamined Patent Application Publication No. 2004-057098).

BRIEF SUMMARY

However, a conventional grip for fishing rod includes a large number of parts, which makes assembly difficult and time consuming, and adversely affects productivity.

Further, with a conventional grip for fishing rod, a grip force is achieved by the unevenness of the braid and elasticity of the coating on the grip. When the grip for fishing rod is used over a long period of time, the braid and the coating wear down, which impairs the grip force. Thus, there is room for improvement in terms of grip for fishing rod construction.

The present invention has been made in view of the foregoing circumstances, and it is an object of the present invention to provide a grip for fishing rod and a fishing rod capable of minimizing the deterioration in grip strength and improving productivity during assembly with fewer parts.

(1) A grip for fishing rod according to an aspect of the present invention is a grip for fishing rod to be disposed at a rear end portion of a fishing rod body having an elongated rod shape, the grip for fishing rod including: a core body having a cylindrical shape of a predetermined thickness, the core body configured to be fitted onto an outside of a core having a cylindrical shape at the rear end portion of the fishing rod body; and a tail end body configured to cover a rear end opening of the core body. The core body and the tail end body are integral. The core body has a peripheral wall that has a void portion along a grip axis direction.

With the grip for fishing rod according to the aspect of the present invention, the hollow and cylindrical core body and the tail end body are integral, and thus can be formed by using, for example, a 3D printer. Thus, time and effort spent on assembly can be reduced further than in the case of a conventional product including many parts, which makes assembly work easier.

Further, the void portion is formed in the peripheral wall of the core body. Accordingly, an elastic grip feel can be achieved, and a predetermined grip force can be constantly maintained because the core body elastically deforms due to the force applied to the grip.

(2) The core body may include a perforated portion recessed from an outer surface of the core body in a thickness direction of the core body.

With this configuration, when a fisher holds the grip, the fisher's palm sits in the recesses of the perforated portion formed on the outer surface of the core body. This allows the fisher to adjust how his/her palm sits on the grip, thereby securing the grip force.

(3) The peripheral wall of the core body may include an outer peripheral wall and an inner peripheral wall. In this case, the void portion is located between the outer peripheral wall and the inner peripheral wall, and the perforated portion consists of a plurality of notch recesses recessed in a thickness direction of the outer peripheral wall.

With this configuration, the plurality of notch recesses are formed in the outer peripheral wall on the outer surface side of the core body and provide a soft grip feel because the fisher's palm lightly sits in the notch recesses. Further, because the notch recesses are only formed in the outer peripheral wall of the core body, the fisher's hand can resist compression force when gripping, and also the grip strength can be maintained.

(4) The peripheral wall of the core body may include an outer peripheral wall and an inner peripheral wall. In this case, the void portion is located between the outer peripheral wall and the inner peripheral wall, and the perforated portion consists of a plurality of notch holes penetrating the outer peripheral wall in a thickness direction of the outer peripheral wall.

With this configuration, the plurality of notch holes are formed in the outer peripheral wall on the outer surface side of the core body, and the fisher's palm deeply sits in the notch holes to provide a sturdy grip feel. Further, because the perforated portion (notch holes) is only formed in the outer peripheral wall of the core body, the fisher's hand can resist compression force when gripping, and also the grip strength can be maintained.

(5) The peripheral wall of the core body may include an outer peripheral wall and an inner peripheral wall. In this case, the void portion is located between the outer peripheral wall and the inner peripheral wall, the perforated portion consists of a plurality of through holes penetrating the outer peripheral wall in a thickness direction of the outer peripheral wall, the outer peripheral wall includes lattice portions arranged in a lattice pattern and extending in a circumferential direction of the core body and the grip axis direction, and the plurality of through holes are defined by the lattice portions.

With this configuration, the plurality of through holes are formed in the outer peripheral wall of the core body, and the fisher's palm deeply sits in the through holes to provide a sturdy grip feel. Further, because the perforated portion (through holes) is only formed in the outer peripheral wall of the core body, the fisher's hand can resist compression force when gripping, and also the grip strength can be maintained. In addition, the core body is formed into a lattice shape with the lattice portions, which imparts to the core body strength against bending that occurs when the grip is fitted onto a fishing rod core during assembly.

(6) The tail end body may connect rear end portions of the outer peripheral wall and the inner peripheral wall of the core body, and may be continuous with the outer peripheral wall.

With this configuration, because the outer peripheral wall and the inner peripheral wall of the core body are joined integrally at the rear end portions by the tail end body, it is possible to increase the strength of the rear end side of the core body to provide a dual-layer structure. Further, because the tail end body is used to connect the rear end portions of the outer peripheral wall and the inner peripheral wall, no other component serving as a connector is needed. Thus, the overall configuration of the grip for fishing rod can be simplified, and assembly can be made more efficient.

(7) The grip for fishing rod may further include a cover portion that is integral with the core body for covering the core body and that defines a predetermined external shape of the grip for fishing rod, and the grip for fishing rod may have a dual-layer structure composed of the core body and the cover portion.

With this configuration, both the cover portion and the core body can be formed integrally, and assembly work of the grip for fishing rod can be made more efficient.

(8) A fishing rod according to an aspect of the present invention is a fishing rod including the grip for fishing rod of any one of (1) to (7) above provided at the rear end portion of the fishing rod body, in which the core body fits on an outside of the core at the rear end portion of the fishing rod body, and the core body is cylindrical and integral with the tail end body.

With the fishing rod according to an aspect of the present invention, a fishing rod that achieves the actions and effects described in (1) to (7) above can be provided.

With the grip for fishing rod and fishing rod according to the present invention, reduction in grip strength can be minimized and productivity during assembly can be improved because the grip for fishing rod has fewer parts.

DETAILED DESCRIPTION

Figure 1:
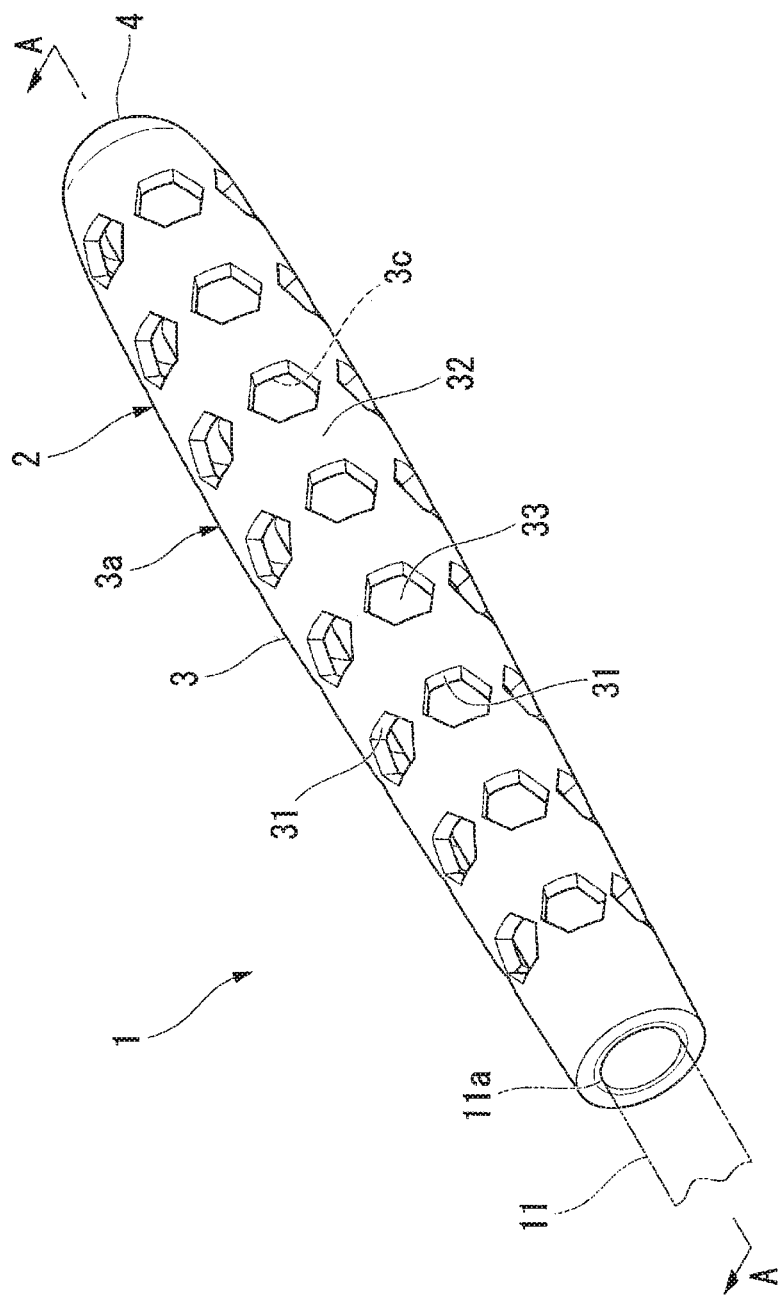
FIG. 1 is a perspective view of a fishing rod including a grip according to a first embodiment of the present invention as viewed laterally from a rod tip side.
Figure 2:
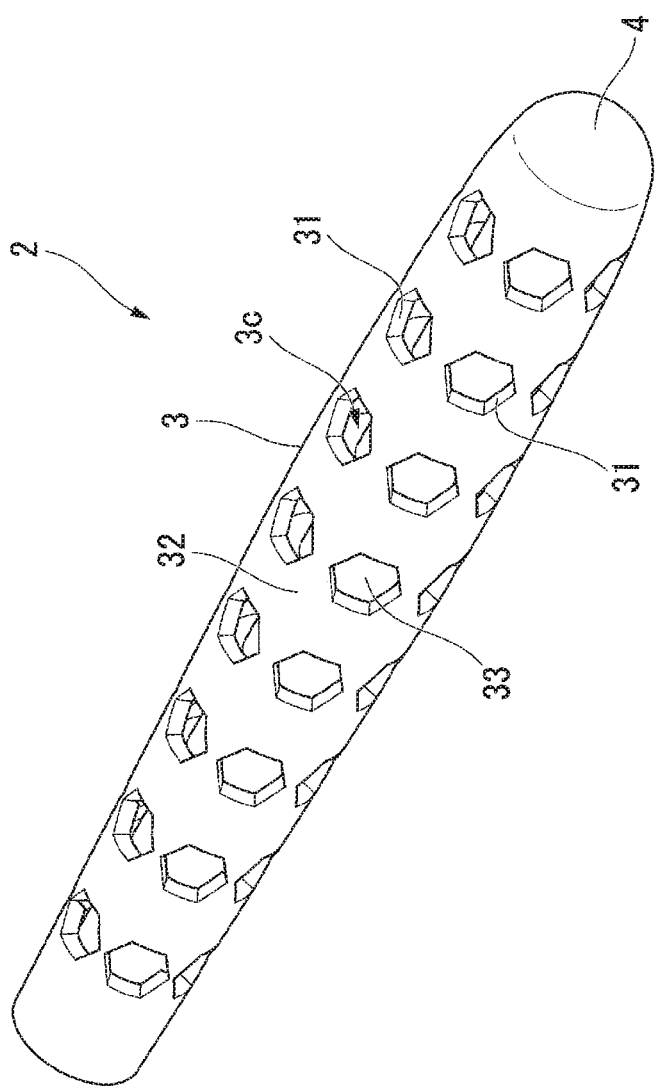
FIG. 2 is a perspective view of the grip in FIG. 1 as viewed laterally from a rod tail side.

An embodiment of a grip for fishing rod and a fishing rod according to the present invention will be described with reference to the drawings. In the present embodiment, a rod for catching carp is given as an example. In the drawings, some components are illustrated on a modified scale as required to make those components visible.

First Embodiment

Figure 4:
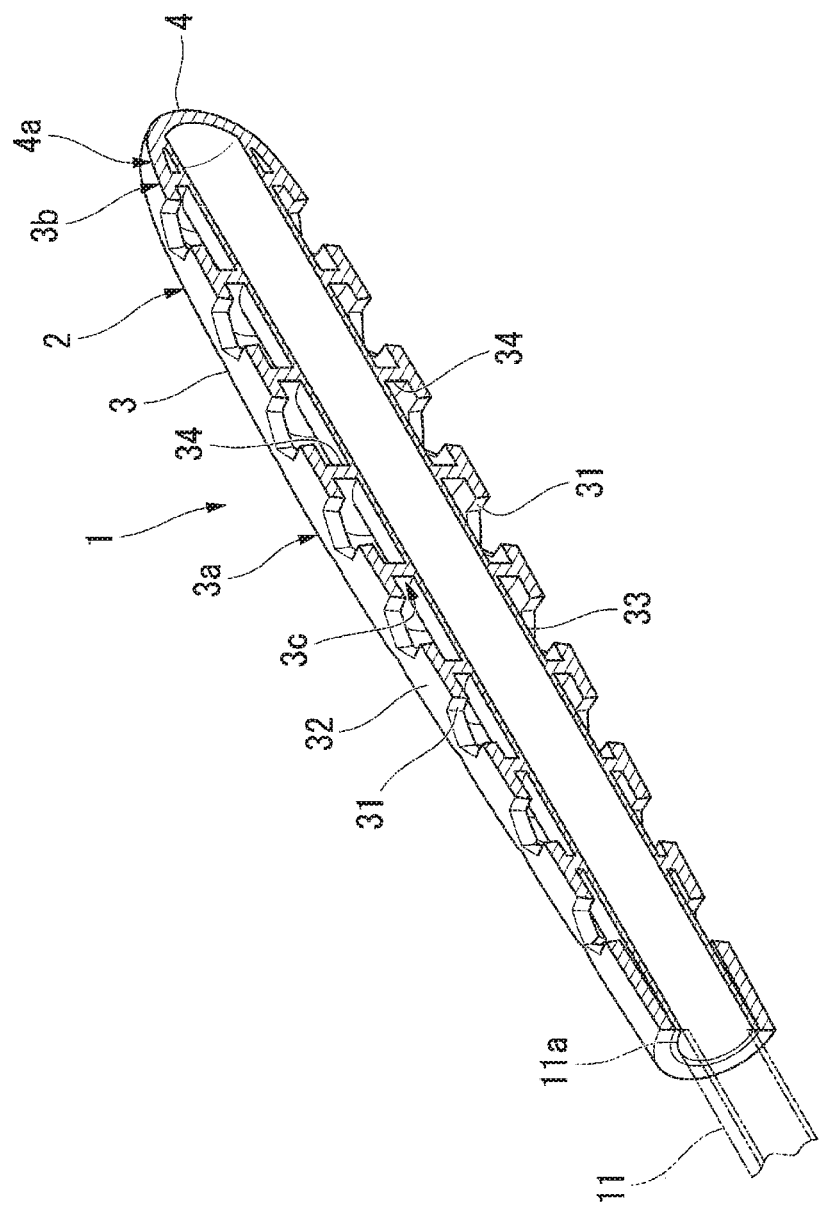
FIG. 4 is a cross-sectional perspective view taken along line A-A in FIG. 1 and illustrates the grip cut in half.
Figure 5:
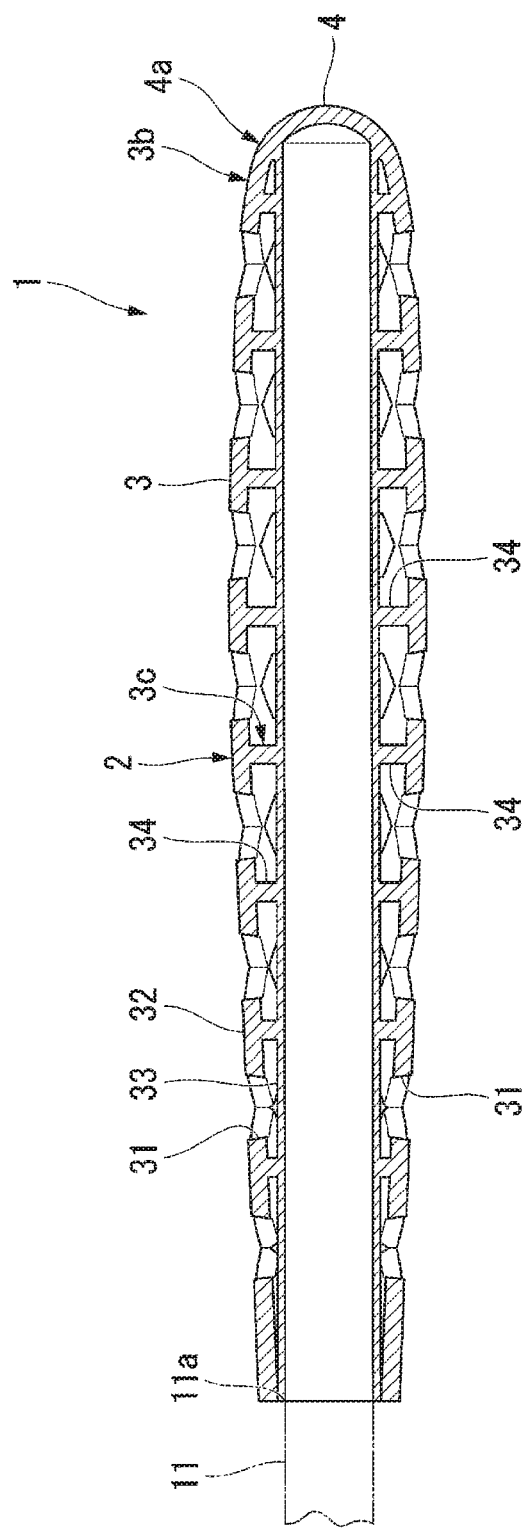
FIG. 5 is a cross-sectional perspective view taken along line B-B in FIG. 3 and illustrates the grip cut in half.
Figure 6:
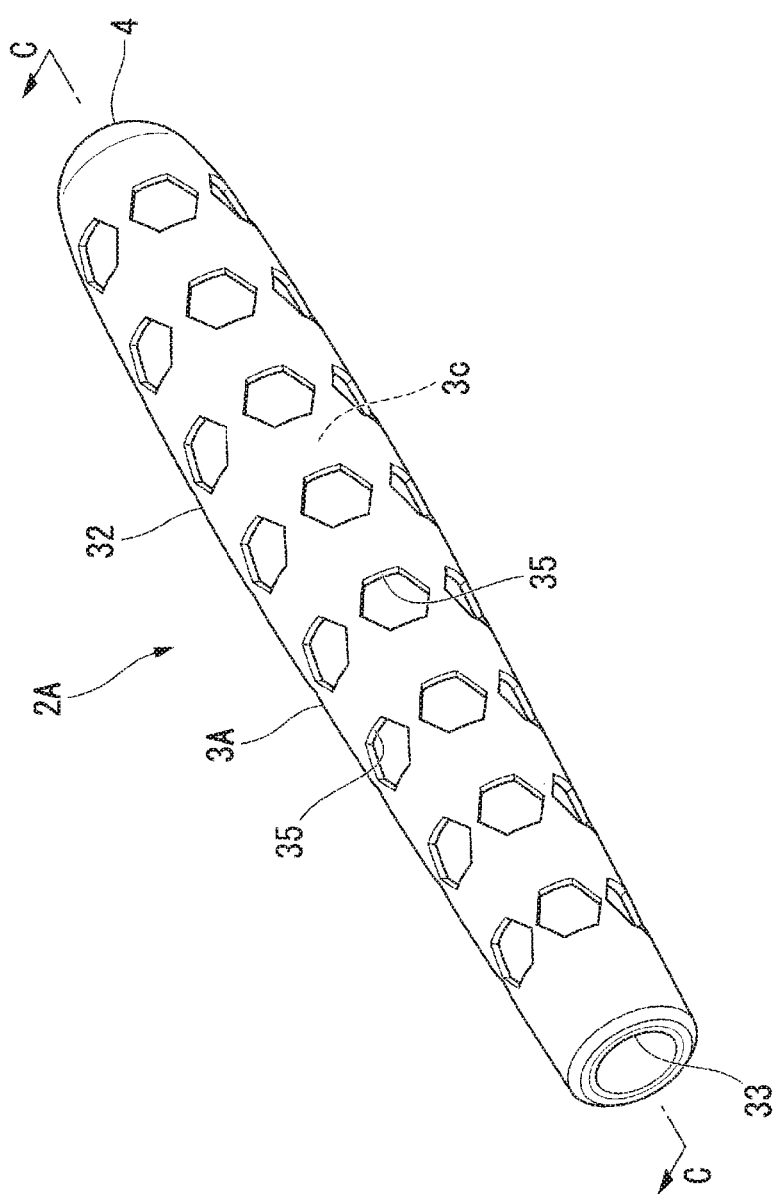
FIG. 6 is a perspective view of the configuration of a grip according to a second embodiment, as viewed laterally from a rod tip side.
Figure 7:
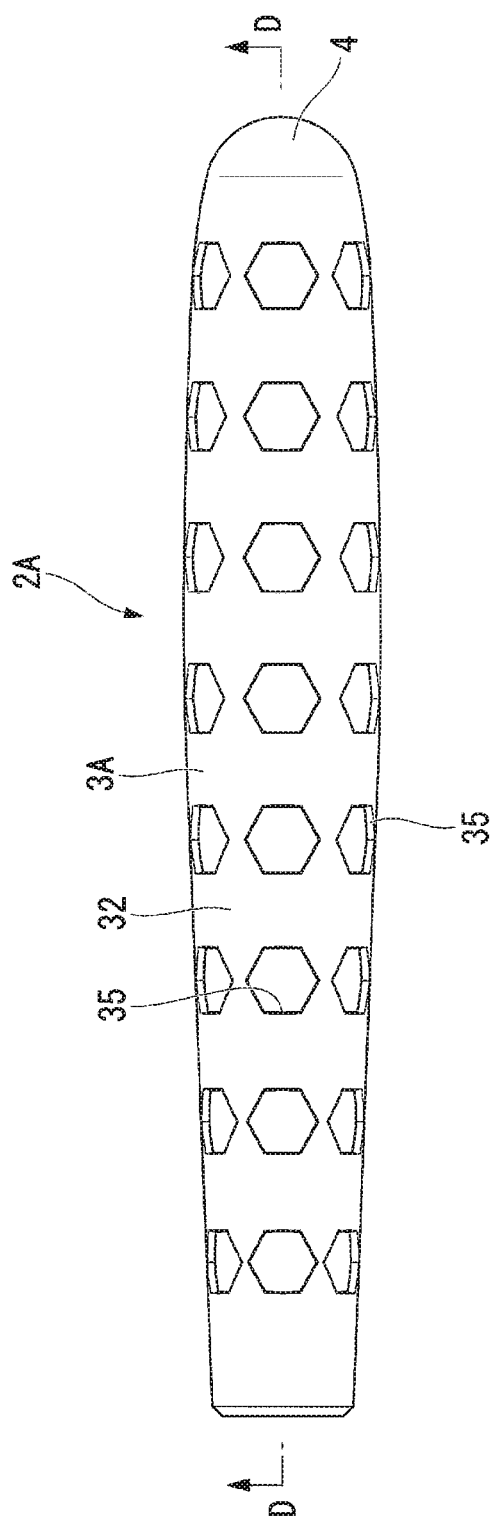
FIG. 7 is a side view of the grip in FIG. 6.

As illustrated in FIG. 1, a fishing rod 1 according to the present embodiment includes a fishing rod body 11 of an elongated rod shape and a grip 2 (grip for fishing rod) disposed at a rear end portion of the fishing rod body 11 (see FIGS. 4 and 5).

In the present embodiment, a distal end of the fishing rod 1 in a length direction of the fishing rod 1 is a rod tip, and a proximal end of the fishing rod 1 in the length direction is a rod tail. The length direction from the rod tip to the rod tail is a front/rear direction, a side closer to the rod tip in the front/rear direction is a front side, and a side closer to the rod tail in the front/rear direction is a rear side. In addition, a direction around a rod axis that is the center axis of the fishing rod body 11 is a circumferential direction.

The fishing rod body 11 is a single body formed by joining a plurality (e.g., three or four) of tubes having an elongated cylindrical shape. Among the plurality of tubes, the tube closest to the rod tip has the smallest diameter, and the other tubes have larger diameters in order toward the rod tail side. In other words, a rear end portion of a first tube on the rod tip side is fitted into a front end portion of a second tube. Each tube is manufactured using a known technique, such as winding carbon fibers to form a cylindrical shape. The plurality of tubes are joined, in which the tubes are fitted onto one another in order of size in a rod axis direction, to thereby form the fishing rod 1 used for actual fishing.

The grip 2 is a portion that is provided around a main body 11a of the fishing rod body 11 and is actually gripped by a fisher when operating the fishing rod 1. The grip 2 has a cylindrical shape of a predetermined thickness and has an external shape that can easily be gripped. The grip 2 includes a core body 3 and a tail end body 4. The core body 3 fits onto an outside of the main body 11a having a cylindrical shape at the rear end portion of the fishing rod body 11. The tail end body 4 covers a rear opening of the core body 3. The core body 3 and the tail end body 4 of the grip 2 are integral with each other. An elastic member such as a rubber material, a resin material, a metal, an ABS resin, a nylon resin, or a polypropylene resin is used to form the members of the grip 2. The grip 2 can be formed by using, for example, a 3D printer.

Figure 3:
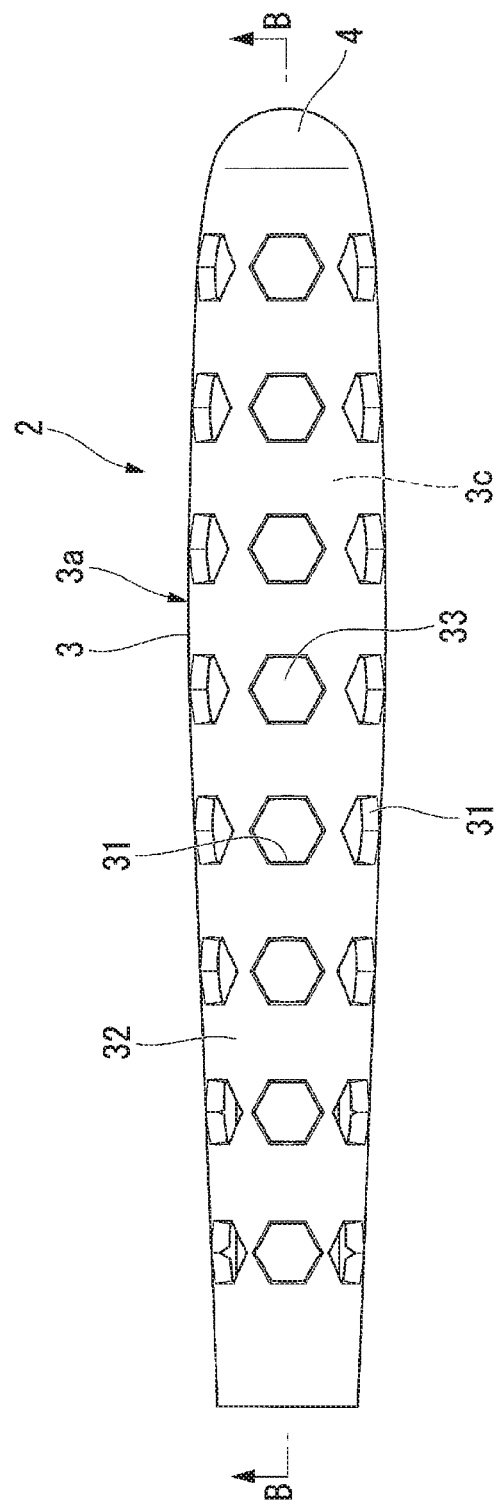
FIG. 3 is a side view of the grip in FIG. 1.

As illustrated in FIGS. 3 and 4, the core body 3 has an overall cylindrical shape and is formed into a substantially spindle-like shape. A peripheral wall of the core body 3 has a void portion 3c along the entire grip axis direction. The core body 3 includes a bulging portion 3a at which the outer diameter of the core body 3 is at a maximum on the rod tail side. The core body 3 is formed such that the outer diameter seamlessly narrows from the bulging portion 3a toward the rod tip side. The core body 3 is also formed such that the inner diameter of the core body 3 substantially coincides with the outer diameter of the main body 11a disposed at the rear end portion of the fishing rod body 11.

A plurality of notch holes 31 (perforated portion) are formed on an outer surface of the core body 3. Each of the plurality of notch holes 31 is recessed in a thickness direction. The peripheral wall of the core body 3 includes an outer peripheral wall 32 and an inner peripheral wall 33. The void portion 3c is formed between the outer peripheral wall 32 and the inner peripheral wall 33. The shape of the outer peripheral wall 32 of the core body 3 forms the external shape of the grip 2. The outer peripheral wall 32 is thicker than the inner peripheral wall 33.

As illustrated in FIGS. 4 and 5, a support wall 34 that connects the outer peripheral wall 32 and the inner peripheral wall 33 in the thickness direction is formed in the void portion 3c between the outer peripheral wall 32 and the inner peripheral wall 33. The support wall 34 connects the outer peripheral wall 32 and the inner peripheral wall 33 between two adjacent notch holes 31 and divides the void portion 3c into a plurality of sections in the grip axis direction.

The support wall 34 in the void portion 3c makes it possible to maintain a constant gap between the outer peripheral wall 32 and the inner peripheral wall 33. In addition, an appropriate amount of elastic deformation can be generated at a gripped portion of the outer peripheral wall 32 when the core body 3 is gripped by a fisher. This provides the fisher with a suitable grip feel and facilitates restoration of the outer peripheral wall 32 from the elastic deformation when the fisher's hand is released from the grip 2. Thus, the grip force can be sustained and the external shape of the grip 2 can be maintained for a long period of time. The support wall 34 also makes it possible to increase the area of contact between the outer peripheral wall 32 and the inner peripheral wall 33, which reinforces the core body 3.

Each of the notch holes 31 penetrates the outer peripheral wall 32 in the thickness direction of the outer peripheral wall 32. Each notch hole 31 has an opening of a regular hexagonal shape in a plan view. The plurality of notch holes 31 are aligned and separated at constant intervals along the circumferential direction of the core body 3 and the grip axis direction. In the present embodiment, the six notch holes 31 are arranged in the circumferential direction and the eight notch holes 31 are arranged in the grip axis direction. In the core body 3, the notch holes 31 are in communication with the void portion 3c between the outer peripheral wall 32 and the inner peripheral wall 33 such that the void portion 3c and the inner peripheral wall 33 can be viewed through each notch hole 31 from outside the grip 2.

The inner peripheral wall 33 has a cylindrical shape and does not include any openings that connect the inside and outside of the inner peripheral wall 33 in the radial direction.

As illustrated in FIGS. 4 and 5, the tail end body 4 includes a joining portion 4a that joins to a rear end portion 3b of the core body 3 between the outer peripheral wall 32 and the inner peripheral wall 33, and the joining portion 4a is configured to cover a rear end opening of the core body 3. The tail end body 4 has a hemispherical curved shape and is smoothly continuous to the rear end portion 3b of the core body 3.

Next, operations of the grip 2 and the fishing rod 1 configured as described above will be described in detail with reference to the drawings.

As illustrated in FIGS. 1 to 5, in the grip 2 according to the present embodiment, the hollow and cylindrical core body 3 and the tail end body 4 are integral and can be formed by using, for example, a 3D printer. Thus, time and effort spent on assembly can be reduced further than in the case of a conventional product that is composed of many parts, and the assembly work can be facilitated.

In the present embodiment, the hollow core body 3 provides an elastic grip feel, and a predetermined grip force can be constantly maintained because the core body 3 elastically deforms due to the force with which the grip 2 is gripped.

In the present embodiment, the outer peripheral wall 32 of the core body 3 has the plurality of notch holes 31 that penetrate the outer peripheral wall 32 in the thickness direction. As a result, when a fisher holds the grip 2, the fisher's palm sits in the recesses of the plurality of notch holes 31 that form the perforated portion on the outer surface of the core body 3. This allows the fisher to adjust how his/her palm sits on the grip 2, thereby securing the grip force.

In particular, in the present embodiment, the core body 3 has the plurality of notch holes 31 that penetrate the outer peripheral wall 32, and the fisher's palm deeply sits in the notch holes 31 to provide a sturdy grip feel. Further, because the notch holes 31 are only located in the outer peripheral wall 32 of the core body 3, the fisher's hand can resist the compression force when gripping, and the grip strength can be maintained.

In the present embodiment, the outer peripheral wall 32 and the inner peripheral wall 33 of the core body 3 are joined integrally at the rear end portion 3b by the tail end body 4, and thus it is possible to increase the strength of the rear end side of the core body 3 with a dual-layer structure.

Further, because the tail end body 4 is used to join the rear end portions of the outer peripheral wall 32 and the inner peripheral wall 33, no other joining component is needed. Thus, the overall configuration of the grip 2 can be simplified and the assembly work can be more efficient.

With the grip for fishing rod and fishing rod configured as described above according to the present embodiment, the grip force can be maintained, and the assembly work can be facilitated because the grip for fishing rod has fewer parts.

Next, a grip for fishing rod and a fishing rod according to other embodiments will be described. Components having the same function as those in the first embodiment described above will be denoted by the same reference signs and a detailed description thereof will be omitted.

Second Embodiment

A grip 2A (grip for fishing rod) according to a second embodiment illustrated in FIGS. 6 to 9 has a configuration in which a perforated portion located in the outer peripheral wall 32 of a core body 3A has a plurality of notch recesses 35 that do not penetrate the outer peripheral wall 32 in the thickness direction. Each notch recess 35 is of a shape that is recessed in the thickness direction of the outer peripheral wall 32 and has an opening with a regular hexagonal shape in a plan view. Similar to the notch holes 31 in the first embodiment described above, the notch recesses 35 are arranged along the circumferential direction of the core body 3A and the grip axis direction separated at constant intervals. The core body 3A has a configuration in which the notch recesses 35 do not communicate with the void portion 3c (see FIGS. 8 and 9) between the outer peripheral wall 32 and the inner peripheral wall 33. The inner peripheral wall 33 does not include a portion that penetrates the entire inner peripheral wall 33 in the thickness direction.

Figure 8:
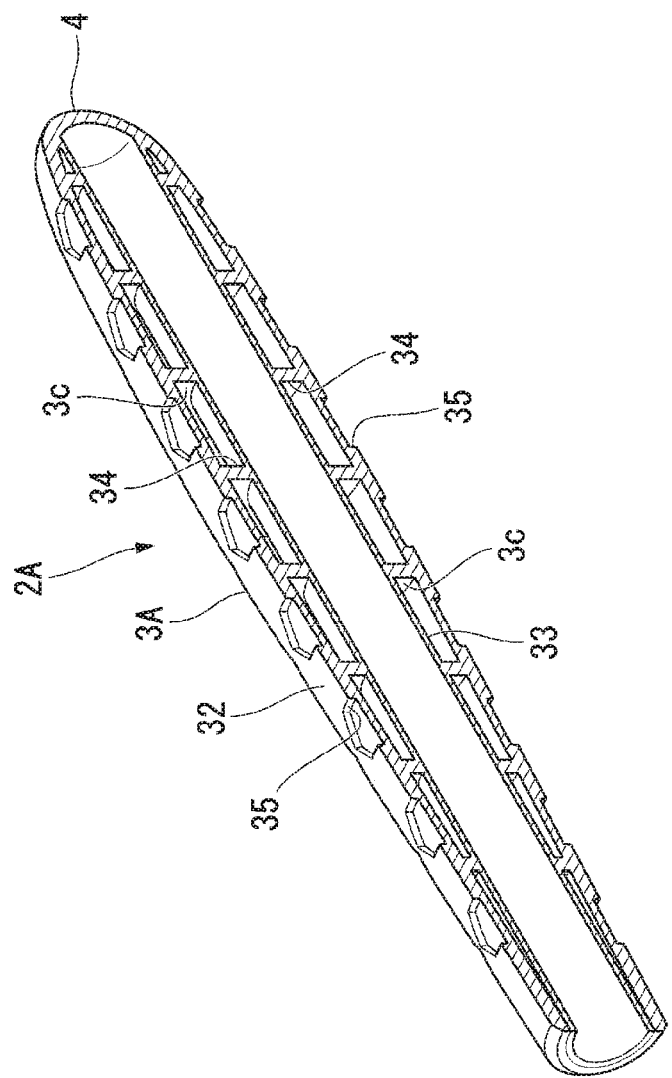
FIG. 8 is a cross-sectional perspective view taken along line C-C in FIG. 6 and illustrates the grip cut in half.
Figure 9:
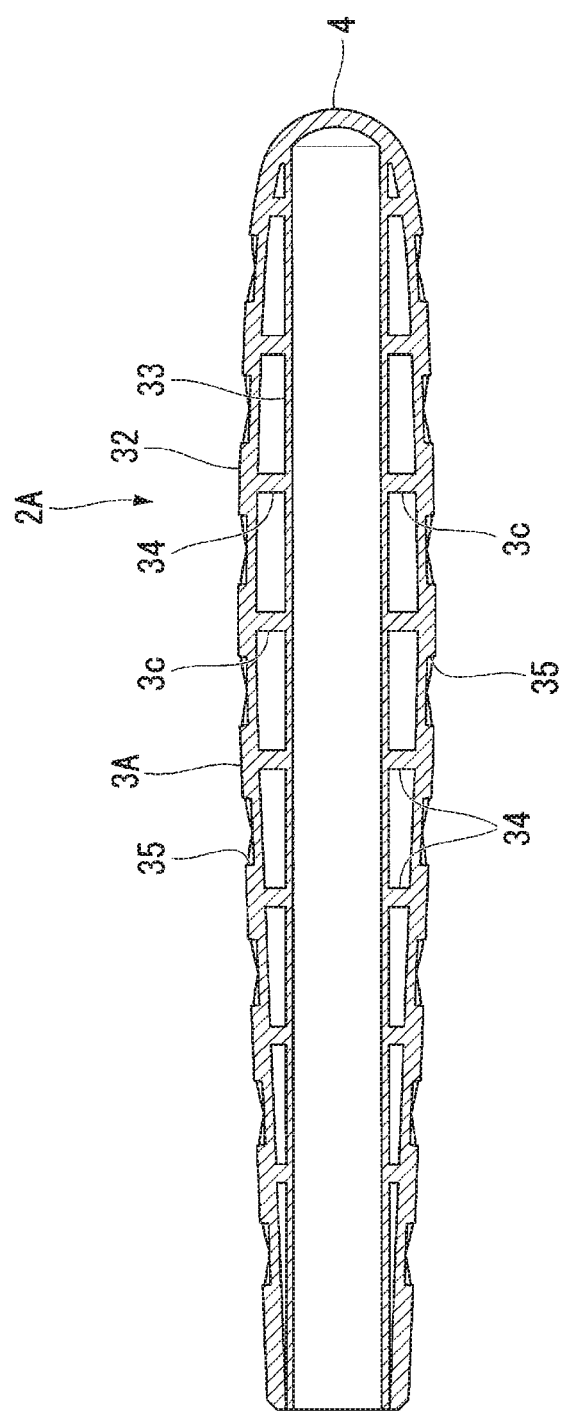
FIG. 9 is a cross-sectional perspective view taken along line D-D in FIG. 7 and illustrates the grip cut in half.

As illustrated in FIGS. 8 and 9, similar to the first embodiment, the support wall 34 that connects the outer peripheral wall 32 and the inner peripheral wall 33 in the thickness direction is disposed in the void portion 3c between the outer peripheral wall 32 and the inner peripheral wall 33. The support wall 34 connects the outer peripheral wall 32 and the inner peripheral wall 33 between two adjacent notch recesses 35 and partitions the void portion 3c into a plurality of sections in the grip axis direction. The position at which the support wall 34 is connected to the outer peripheral wall 32 is a region in which no notch recess 35 is located. The support wall 34 improves the grip feel, facilitates the restoration of the outer peripheral wall 32, and provides reinforcement, similar to the first embodiment.

In the grip 2A according to the second embodiment, the plurality of notch recesses 35 are located in the outer peripheral wall on the surface side of the core body 3A and provide a soft grip feel because the fisher's palm lightly sits in the notch recesses 35. Further, because the notch recesses 35 are only located in the outer peripheral wall 32 of the core body 3A, the fisher's hand can resist the compression force when gripping, and the grip strength can be maintained.

Further, the outer peripheral wall 32 of the grip 2A according to the present embodiment includes no openings, which provides the benefits of increasing overall rigidity of the grip 2A and minimizing damages such as tearing from an open portion.

Third Embodiment

Figure 10:
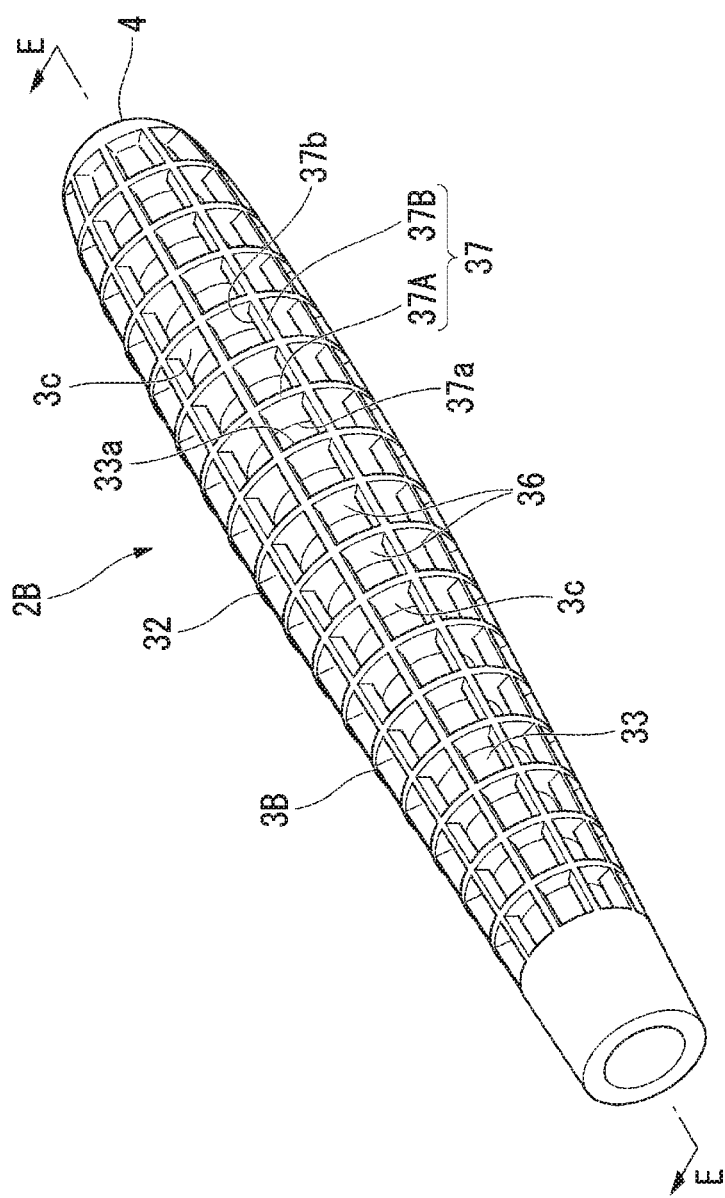
FIG. 10 is a perspective view of a grip according to a third embodiment, as viewed laterally from a rod tip side.
Figure 11:
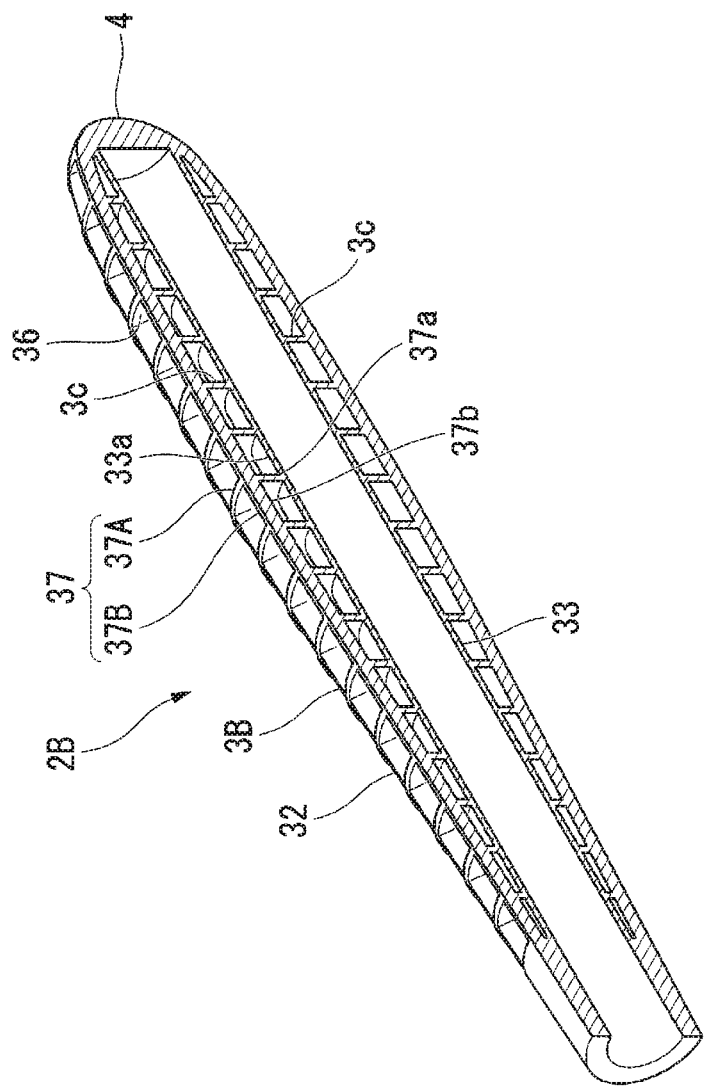
FIG. 11 is a cross-sectional perspective view taken along line E-E in FIG. 10 and illustrates the grip cut in half.
Figure 12:
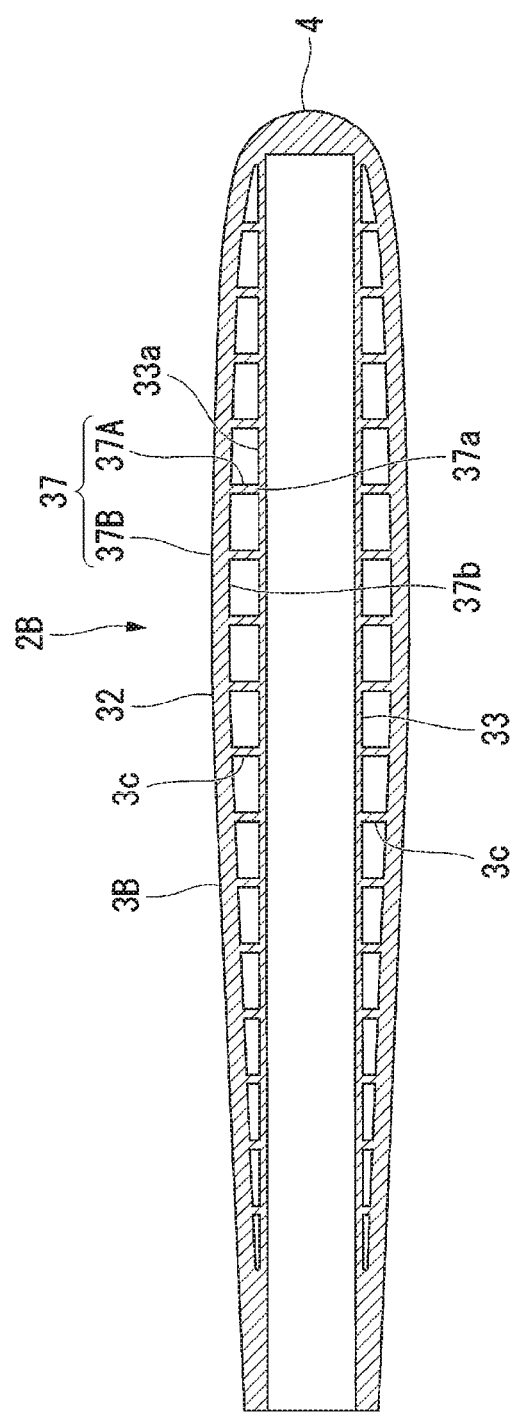
FIG. 12 is a cross-sectional view of the grip in FIG. 11 and corresponds to FIG. 5.

Next, a grip 2B according to a third embodiment will be described with reference to FIGS. 10 to 12.

In the grip 2B (grip for fishing rod) according to the third embodiment, a core body 3B includes the outer peripheral wall 32 and the inner peripheral wall 33, and a space is present between the outer peripheral wall 32 and the inner peripheral wall 33. A plurality of lattice holes 36 (through holes, perforated portion) that penetrate the outer peripheral wall 32 in the thickness direction are located in the outer peripheral wall 32. Lattice portions 37 are formed in the outer peripheral wall 32. The lattice portions 37 are arranged in a lattice pattern and extend in the circumferential direction of the core body 3B and the grip axis direction. Each of the plurality of lattice holes 36 is a rectangular opening in a plan view defined by the lattice portions 37. In the present embodiment, each of the lattice portions 37 includes a circumferential-side lattice wall 37A extending in the circumferential direction and an axis-side lattice wall 37B extending in the grip axis direction.

A lower edge 37a of the circumferential-side lattice wall 37A of the lattice portion 37 extends to the inner peripheral wall 33 through the void portion 3c and connects with an outer peripheral surface 33a of the inner peripheral wall 33. Thus, in the grip 2B according to the present embodiment, the void portion 3c of the core body 3B is divided by the circumferential-side lattice walls 37A. A lower edge 37b of the axis-side lattice wall 37B is separated from the inner peripheral wall 33 without connecting to the inner peripheral wall 33. The lower edge 37b corresponds to a lower edge of the outer peripheral wall 32.

In the core body 3B according to the present embodiment, the circumferential-side lattice walls 37A connect the outer peripheral wall 32 and the inner peripheral wall 33 and partition the void portion 3c into a plurality of sections in the grip axis direction. The circumferential-side lattice walls 37A make it possible to maintain a constant interval between the outer peripheral wall 32 and the inner peripheral wall 33. In addition, an appropriate amount of elastic deformation can be generated at a portion of the outer peripheral wall 32 that is gripped when the core body 3B is gripped by a fisher. This provides the fisher with a suitable grip feel and facilitates restoration of the outer peripheral wall 32 after elastic deformation when the fisher's hand is released from the grip 2B. Thus, the grip force can be sustained and the external shape of the grip 2B can be maintained for a long period of time. The circumferential-side lattice walls 37A also make it possible to increase the area of contact between the outer peripheral wall 32 and the inner peripheral wall 33, which reinforces the core body 3B.

In the third embodiment, the plurality of lattice holes 36 are located in the outer peripheral wall of the core body 3B, and the fisher's palm deeply sits in the lattice holes 36 to provide a sturdy grip feel. Further, because the lattice holes 36 are formed along the entire core body 3B, the fisher's hand can resist the compression force when gripping, and the grip force can be maintained. In addition, the core body 3B has a lattice shape with the lattice holes 36, which makes the core body 3B a shape strong against bending that occurs when the grip 2B is fitted onto a fishing rod core during assembly.

Embodiments of a grip for fishing rod and a fishing rod according to the present invention have been described above, but these embodiments are merely exemplary and are not intended to limit the scope of the invention. The embodiments can be implemented in a variety of different ways, and omissions, replacements, and changes can be made without departing from the gist of the invention. The embodiments and modification examples can also include substantially identical components and components within an equal range from the viewpoint of a person having ordinary skill in the art.

For example, in the embodiments described above, a rod for catching carp is described, but the present invention is not limited to a rod for catching carp and may be applied to any common fishing rod that includes a grip.

The shapes of the notch hole 31, the notched recess 35, and the lattice hole 36 are not limited to a hexagon or a square as described in the embodiments, and may be set to any appropriate shape provided that the notch holes 31, the notch recesses 35, or the lattice holes 36 constitute the perforated portion.

As another embodiment, the fishing rod may have a dual-layer structure composed of the core body and a cover portion that is integral with the core body for covering the core body and that defines a predetermined external shape of the grip for fishing rod. With this configuration, the cover portion and the core body are integral, and the assembly work of the grip for fishing rod can be made more efficient.

Note that the layers of the dual-layer structure composed of the core body and the cover portion may be made of different materials, provided that the layers are integral.

The above-described embodiments apply to a grip in which all components are integral using the same material, but individual members may be formed of different materials. For example, the outer peripheral wall 32 and the inner peripheral wall 33 of the core body 3 may be formed of different materials, and the core body 3 and the tail end body 4 may be formed of different materials.

The configuration of the grip for fishing rod, such as the external shape, the length dimension in the grip axis direction, the diameter dimension, and the thickness of the grip for fishing rod, may be set appropriately depending on factors such as the radial dimension of the rod tail side of the fishing rod and the strength of the fishing rod body.

REFERENCE SIGNS LIST

1 Fishing rod
2, 2A, 2B Grip (grip for fishing rod)
3, 3A, 3B Core body
3c Void portion
4 Tail end body
11 Fishing rod body
31 Notch hole (perforated portion)
32 Outer peripheral wall
33 Inner peripheral wall
34 Support wall
35 Notch recess (perforated portion)
36 Lattice hole (through hole, perforated portion)
37 Lattice portion
37A Circumferential-side lattice wall
37B Axis-side lattice wall

What is claimed is:

1. A grip for a fishing rod disposable at a rear end portion of the fishing rod, the grip for the fishing rod comprising:
a core body having a cylindrical shape of a predetermined thickness, the core body configured to be fitted onto an outside of the rear end portion of the fishing rod; and
a tail end body configured to cover a rear end opening of the core body,
the core body having a peripheral wall that has a void portion extending along a grip axis direction,
the peripheral wall of the core body including an outer peripheral wall and an inner peripheral wall disposed apart from each other in a state in which the void portion is located between the outer peripheral wall and the inner peripheral wall,
the tail end body having a connecting portion connecting a rearmost end portion of the outer peripheral wall and a rearmost end portion of the inner peripheral wall, the connecting portion covering the rear end opening of the core body,
the tail end body and the core body including the outer peripheral wall and the inner peripheral wall being formed as a single member,
the core body further having support walls connecting the outer peripheral wall and the inner peripheral wall, the void portion being separated into individual void portions by the support walls, and
the outer peripheral wall having notches corresponding to the individual void portions respectively, each notch being smaller than a corresponding one of the individual void portions.

2. The grip for fishing rod according to claim 1, wherein the core body includes a perforated portion recessed from an outer surface of the core body in a thickness direction of the core body.

3. The grip for fishing rod according to claim 2, wherein the notches are notch recesses formed in a thickness direction of the outer peripheral wall, and
the notch recesses constitute the perforated portion.

4. The grip for fishing rod according to claim 2, wherein the notches are notch holes penetrating the outer peripheral wall in a thickness direction of the outer peripheral wall, and
the notch holes constitute the perforated portion.

5. The grip for fishing rod according to claim 1, wherein the tail end body is continuous with the outer peripheral wall.

6. The grip for fishing rod according to claim 1, further comprising:
a bulging portion at which an outer diameter of the core body is at a maximum.

7. The grip for fishing rod according to claim 6, wherein the outer diameter of the core body narrows from the bulging portion toward a front end side of the core body.

8. A fishing rod comprising:
a fishing rod body at a rear end portion of the fishing rod; and
a grip for the fishing rod according to claim 1, the grip for the fishing rod being disposed at a rear end portion of the fishing rod body,
wherein the core body fits on an outside of the rear end portion of the fishing rod body, the core body being cylindrical and integral with the tail end body.

9. The fishing rod of claim 8, wherein
an inner diameter of the core body coincides with an outer diameter of the rear end portion of the fishing rod body.

* * * * *